United States Patent
Ito et al.

(10) Patent No.: US 6,289,279 B1
(45) Date of Patent: Sep. 11, 2001

(54) POSITIONING SYSTEM, METHOD, AND DEVICE FOR OBTAINING INFORMATION ABOUT A CURRENT POSITION

(75) Inventors: Takeshi Ito; Masaharu Yoshimori, both of Tokyo; Eiji Kawai, Kanagawa, all of (JP)

(73) Assignee: Sony Computer Entertainment, Inc., Tokyo (JP)

( * ) Notice: Subject to any disclaimer, the term of this patent is extended or adjusted under 35 U.S.C. 154(b) by 0 days.

(21) Appl. No.: 09/443,786

(22) Filed: Nov. 19, 1999

(30) Foreign Application Priority Data

Nov. 20, 1998 (JP) .................................................. 10-331383

(51) Int. Cl.⁷ ......................................................... G01S 5/02
(52) U.S. Cl. ........................................ 701/213; 342/357.1
(58) Field of Search ..................................... 701/207, 213, 701/216; 342/357.1

(56) References Cited

U.S. PATENT DOCUMENTS

| | | | |
|---|---|---|---|
| 5,422,813 | | 6/1995 | Schuchman et al. . |
| 5,477,228 | * | 12/1995 | Tiwari et al. .......................... 342/357 |
| 5,689,270 | * | 11/1997 | Kelley et al. .................... 342/357.09 |
| 5,742,509 | * | 4/1998 | Goldberg et al. ...................... 701/211 |
| 5,794,151 | * | 8/1998 | McDonald et al. ................... 455/454 |
| 5,874,914 | * | 2/1999 | Krasner ................................. 701/213 |
| 5,936,572 | * | 8/1999 | Loomis et al. ........................ 342/457 |
| 5,936,573 | * | 8/1999 | Smith .................................... 701/213 |
| 5,982,324 | * | 11/1999 | Watters et al. ................... 342/357.06 |
| 5,999,126 | * | 12/1999 | Ito ....................................... 342/357.1 |
| 6,041,222 | * | 3/2000 | Horton et al. ......................... 455/255 |
| 6,072,429 | * | 6/2000 | Crothall et al. .................... 342/357.1 |
| 6,111,541 | * | 8/2000 | Karmel ............................ 342/357.13 |
| 6,128,501 | * | 10/2000 | Ffoulkes-Jones ..................... 455/456 |

FOREIGN PATENT DOCUMENTS 2 308 033 A   11/1997   (GB) .

* cited by examiner

Primary Examiner—William A. Cuchlinski, Jr.
Assistant Examiner—Eric M Gibson
(74) Attorney, Agent, or Firm—Helfgott & Karas, PC

(57) ABSTRACT

A positioning system for obtaining information concerning a current position of a device even when one is in an underground center or inside a building includes a portable terminal is equipped with a radio-call-reception part having a radio-call-reception function that is a receiving unit which receives data sent from the base station and a positioning function to obtain the primary position data indicating the current position of the device based on data sent from the base station, a GPS-reception part having a positioning function to obtain the secondary position data on measuring the current position of the device based on signals sent from GPS satellites, and a position-data-correction function to correct the secondary position data using the position-correction data sent from the base station, and an information-processing part having a function to perform information processing using position data obtained from the radio-call-reception part and the GPS-reception part.

9 Claims, 2 Drawing Sheets

POSITIONING SYSTEM, METHOD, AND DEVICE FOR OBTAINING INFORMATION ABOUT A CURRENT POSITION

BACKGROUND OF THE INVENTION

1. Field of the Invention

The present invention concerns a positioning system, positioning method, and positioning device to measure the current position of the device.

2. Background of the Invention

Recently, it became possible to use artificial satellites for navigation, and a GPS (Global Positioning System) that makes navigation possible not only for ships but also for cars and people when suitable devices are carried with them has been offered. Economy, safety, and convenience, while travelling towards a destination, are improved by this navigation system.

In addition, in the GPS, positioning errors are corrected and positioning accuracy is improved by making use of a relative positioning method (differential GPS or DGPS). In general, in a differential GPS, positioning errors are corrected by sending out correction data to a GPS receiver from a transmitting station using FM-multiplex broadcasting.

However, a navigation system using FM-multiplex broadcasting with a differential GPS has the problem described below.

First of all, since FM-multiplex broadcasting uses a bandwidth around 80 MHz, it becomes necessary to lengthen the antenna, which is a disadvantage from the standpoint of portability.

Also, since one broadcasting station covers a very wide area, there is a limit to the correction of positioning errors.

In addition, GPS's reception sensitivity is not good underground or inside a building. In general, it cannot receive FM-multiplex data when located underground or inside a building.

When using FM-multiplex broadcasting, the electric power needed at the receiving terminal is large, which is a disadvantage from the standpoint of portability. For example, one had to have large capacity batteries, which was a problem.

SUMMARY OF THE INVENTION

In view of the above-described situation, it is an object of the present invention to provide a positioning system, a positioning method, and a positioning device that enable one to obtain information on the current position of the device even when the latter is located underground or inside a building, as well as to improve portability.

Another object of the present invention is to provide a positioning system and a positioning method that enable one to reduce positioning errors.

A positioning system of the present invention has, in order to solve the abovenoted problems, a radio call base-station, a receiving means to receive data sent from the radio-call base-station, and a positioning device equipped with a positioning means to obtain position data indicating the current position of the device based on data sent from the radio-call base-station.

In a positioning system having such a composition, a positioning device obtains position data indicating the current position of the device based on the data sent from the radio-call base-station, using a positioning means.

By the positioning system, a positioning device can obtain position data as long as it can receive data from the radio-call base-station.

Also, the positioning method of the present invention enables one to obtain the position data showing the current position of the device based on data sent from the radio-call base-station in order to solve the above-noted problems.

The positioning method enables one to obtain position data as long as the data from the radio-call base-station can be received.

The positioning device of the present invention is equipped with a receiving means that receives data sent from the radio-call base-station and a positioning means that obtains position data showing the current position of the device based on data sent from the radio-call base-station in order to solve the above-discussed problems.

A positioning device having such a configuration obtains position data indicating the current position of the device based on data sent from the radio-call base-station by means of the positioning means.

By the positioning means means, the positioning device enables one to obtain position data as long as the data from the radio-call base-station can be received.

The positioning system of the present invention comprises, a radio-call base-station equipped with a position-correction-data-generating means that generates position-correction data to correct the position data that the positioning device obtained by measuring positions and a transmission means to send data to the positioning device. Also, the positioning system of the present invention has a positioning device equipped with a receiving means to receive data sent from the radio-call base-station, a positioning means that obtains position data by measuring the current position of the device based on the signals sent from an artificial satellite, and a position-data-correction means that corrects the position data based on the position-correction data received by the receiving means.

In the positioning system having such a configuration, the radio-call base-station sends out position-correction data generated by a position-correction-data-generating means to the positioning device, using the transmission means. At the positioning device, the position data obtained by measuring the current position of the device based on the signals sent from the artificial satellites by the positioning means are corrected by the position-data-correction means using the position-correction data received by the receiving means.

By the positioning system, the positioning device corrects the position data using the position-correction data sent from a radio-call base-station that covers a relatively narrow service area, data generated at said radio-call base-station.

Also, according to the positioning method of the present invention, in order to solve the above-discussed problems, the position data obtained upon measuring the current position of the device based on signals sent from artificial satellites are corrected using the position-correction data sent from the radio-call base station.

According to the positioning method, the position data are corrected using the position-correction data sent from a radio-call base-station that services a relatively narrow service area, data generated at said radio-call base-station.

DETAILED DESCRIPTION OF THE PREFERRED EMBODIMENT

A positioning system applied to a radio-call system of the present invention will be explained in detail in conjunction with accompanying drawings. A portable terminal, that is a positioning device, carries out an application program based on the position data obtained by the positioning system after measuring positions.

Figure 1:
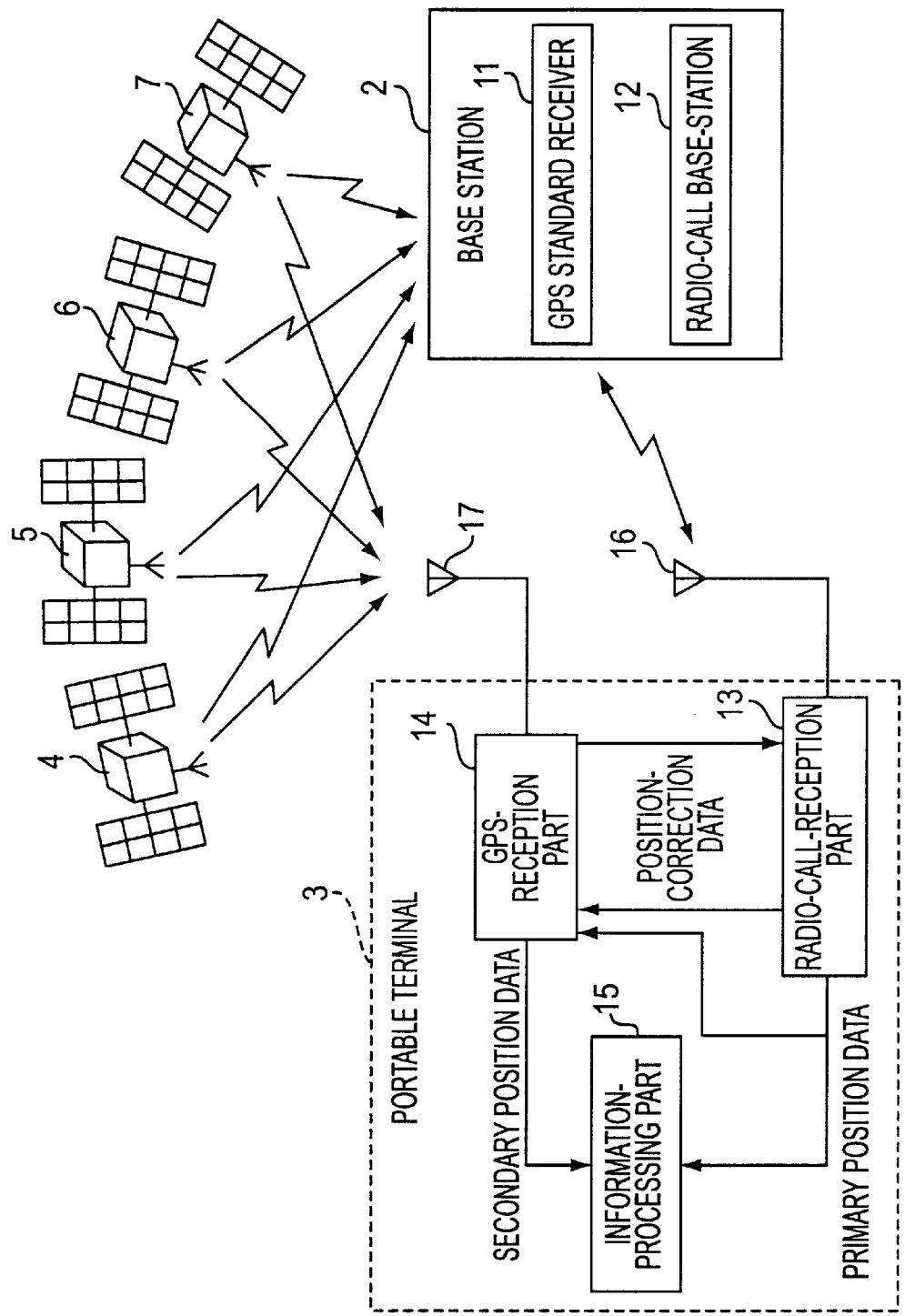
FIG. 1 is a block diagram that shows a positioning system in the form in which the present invention is actually applied.

As shown in FIG. 1, the positioning system includes a base station 2 that broadcasts data, a portable terminal 3 that receives data from the base station 2, and GPS (Global Positioning System) satellites 4, 5, 6, and 7 that send to the base station 2 and the portable terminal 3 signals for measuring positions. In the positioning system, the portable terminal 3 receives as information concerning the terminal's current position primary position data based on data sent from the base station 2 and secondary position data obtained by making use of satellite signals from GPS satellites 4, 5, 6, and 7 (hereafter called GPS signals).

In the positioning system having such a configuration, the base station 2 includes a GPS standard receiver 11 that is a position-correction-data-generating means that generates position-correction data to correct the secondary position data and a radio-call base-station 12 that sends data to the portable terminal 3. The portable terminal 3 is equipped with a radio-call-reception part 13 having a radio-call reception function that is a reception function to receive data sent from base station 2 and a positioning function that obtains the primary position data showing the current position of the terminal based on data sent from the base station 2, a GPS-reception part 14 having a positioning function that obtains the secondary position data after measuring the current position of the terminal based on the signals sent from GPS satellites 4, 5, 6, and 7, and a position-data-correction function that corrects the secondary position data using the position-correction data sent from the base station 2, and an informationprocessing part 15 having a function of performing information processing using the position data obtained by the radio-call-reception part 13 and the GPS-reception part 14.

The base station 2 is composed of a GPS standard receiver 11 and a radio-call base-station 12.

The GPS standard receiver 11, on receiving GPS signals from GPS satellites 4, 5, 6, and 7, obtains information about its own position and generates position-correction data. The GPS standard receiver 11 generates position-correction data by using, for example, a relative positioning method (differential GPS or DGPS).

Here the generation of position-correction data using a relative positioning method will be explained.

The GPS standard receiver 11, that is located at the reference point whose position is accurately known, measures position based on the GPS signals sent from GPS satellites 4, 5, 6, 7, using a GPS receiver. This reference point's position and the position data measured by the GPS receiver are collated and compared at the GPS standard receiver 11. After this collation and comparison, the error component contained in the GPS signals caused by the SA (Selective Availability), the satellites system and the transmission medium is detected at the GPS standard receiver 11. This error component that is detected is called the position-correction data. This is arrived at by utilizing the fact that, if a GPS receiver (portable terminal 3) is found within a 100–200 km range from the reference point (the GPS standard receiver 11), the error in measurement of position is hardly different from the error detected at the reference point. In specific terms, the portable terminal 3 obtains corrected position data by deducting this error component (the position-correction data) from the position data it obtained by measuring its position. Also, it can be said that one can improve the positioning accuracy if the distance from the reference point is small, but the effect of the correction decreases as one moves farther away from the reference point.

By using the relative positioning method described above, one can improve the positioning accuracy of a GPS receiver (the portable terminal 3).

Position-correction data generated at the GPS standard receiver 11 are sent to a portable terminal 3 by the radio-call base-station 12.

The radio-call base-station 12 is a data-transmission station that sends data to the portable terminal 3, and is composed as a data-transmission station in a so-called radio-call system. The base station 2 is created by having this traditional radio-call base-station 12 equipped with a GPS standard receiver 11.

This radio-call base station 12 is made in a way that it sends out various kinds of information to information-receiving terminals such as "pocket-bell" pagers or pager receivers. In other words, the radio-call base-station 12 is, for example, a data-transmission station that sends to information-receiving terminals such as pager data from senders transmitted from a public-telephone network via a radio-call central station.

In addition, in recent years, the radio-call system has been used to deliver various kinds of information such as weather forecasts and information on events to users.

Also, the service area of this radio-call base-station 12 is relatively narrow and is supposed to be narrower than a broadcasting area of a FM-multiplex-broadcasting station, for example.

The radio-call base-station 12 sends area data made up of information showing its own location to the portable terminal 3.

The base station 2, by virtue of being equipped with the GPS standard receiver 11 and the radio-call base-station 12 as described above, sends position-correction data to correct the position data to the portable terminal 3, making use of the radio-call system. As for transmission of position-correction data, these are sent, in concrete terms, included with various kinds of information. Also, a number of such base stations 2 exist in a positioning system, and each base station 2 sends position-correction data obtained on its own to the portable terminals 3 found in the service area.

The radio-call-reception part 13 of portable terminal 3 is made as a receiving means to receive data sent from base station 2. The radio-call-reception part 13 receives the data sent by radio from the base station 2 using antenna 16.

The radio-call-reception part 13 also receives position-correction data sent from the base station 2. The position-correction data received by the radio-call-reception part 13 are output to the GPS-reception part 14.

In addition, the radio-call-reception part 13 is made such that it can obtain the approximate current position of the portable terminal 3 based on the area data sent from the base station 2. The radio-call-reception part 13 measures the current position on its own using this, without using GPS signals.

For example, the radio-call-reception part 13 obtains as the primary position data its own approximate current position from the area data showing the position of the base station 2 sent from the base station. In other words, in this case, the portable terminal 3 located in the service area recognizes as its own current position the location of base station 2.

The primary position data obtained by this radio-call reception part 13 are output to the information-processing part 15.

The GPS-reception part 14 measures the current position on receiving via antenna 17 the GPS signals sent from GPS satellites 4, 5, 6, and 7, and obtains position data.

The GPS-reception part 14 corrects the secondary position data when the radio-call reception-part 13 is receiving position-correction data sent from the base station 2 using these data. And the GPS-reception part 14 outputs the secondary position data thus obtained to the information-processing part 15.

The radio-call-reception part 13 described above also has a function to automatically switch the reception frequency, using the secondary position data. According to this, the radio-call-reception part 13, when it has moved to a service area with a different reception frequency, automatically changes the reception frequency, using the secondary position data.

The information-processing part 15 has a function to execute application programs.

For example, there is a piece of software that allows a map to be displayed as an application program. This program allows a map to be displayed on a display panel such as a liquid-crystal monitor. The information-processing part 15 executes this program using the position data obtained by the radio-call-reception part 13 and the GPS-reception part 14 via the operation described above. In other words, for example, the information-processing part 15 displays in images the current position of the device on the map based on the primary or secondary position data.

Furthermore, the position data are, as described above, either the primary position data, data that indicate the approximate current position of the device, that radio-call-reception part 13 obtained from the data sent from the base station 2 or the secondary position data that the GPS-reception part 14 obtained on measuring the position using the GPS signals sent from GPS satellites 4, 5, 6, and 7. Therefore, the information-processing part 15, for example, normally prefers to use the secondary-position data whose positioning accuracy is higher over the other data to execute programs.

A portable terminal 3 having the above-described composition executes a map-display software program using data sent from the base station 2 or the position data obtained using the GPS signals sent from GPS satellites 4, 5, 6, and 7.

Figure 2:
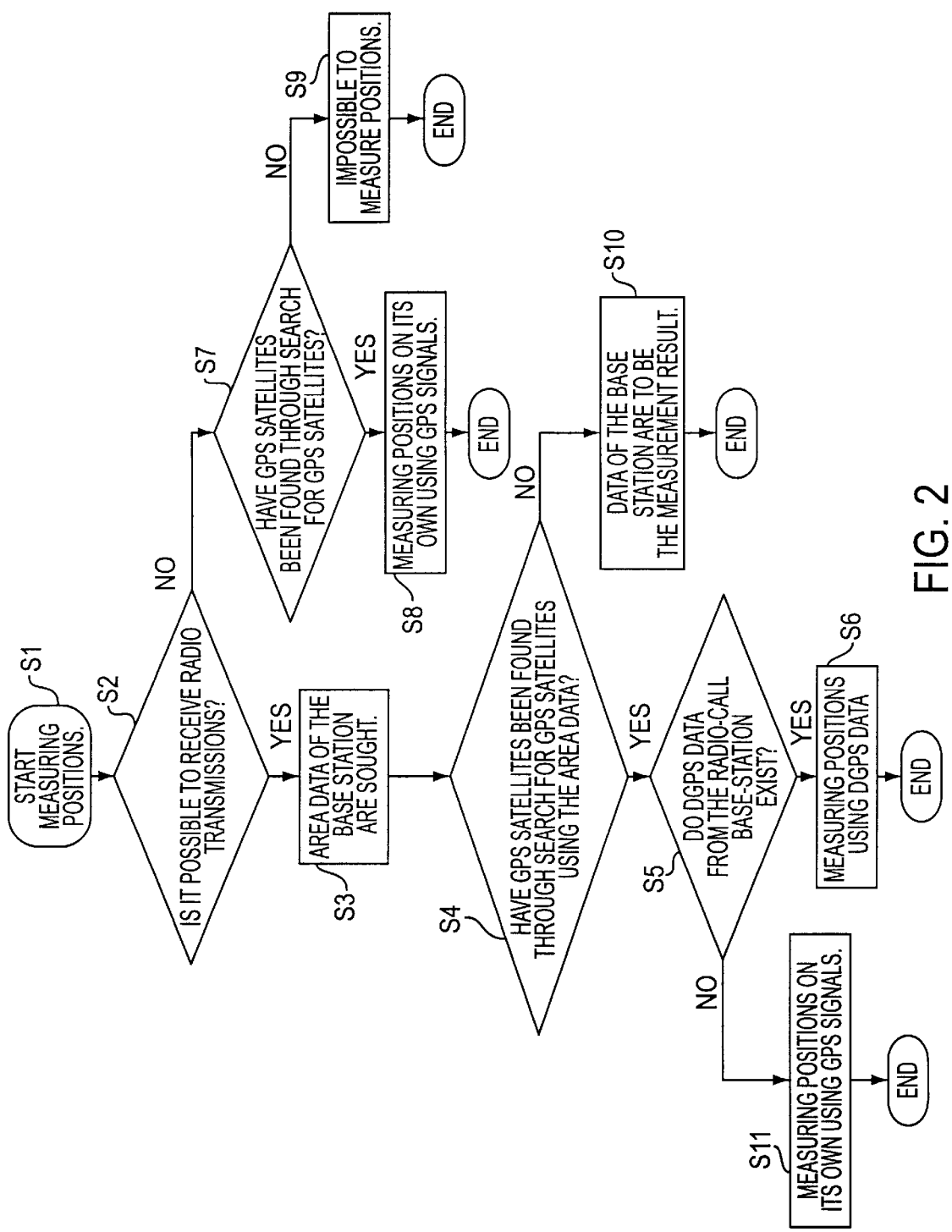
FIG. 2 is a flowchart showing the processing sequence that a portable terminal or device executes to obtain position data in a positioning system.

FIG. 2 shows a sequence of processes the portable terminal 3 executes in order to obtain position data. More specifically, it shows a sequence of processes starting from a search for a desired GPS satellite.

First of all, at step S1, a portable terminal 3 begins the operation of measuring positions. In other words, the portable terminal 3 starts a sequence of processes to obtain position data.

At step S2, the portable terminal 3 discriminates whether it is possible to receive radio transmissions. For example, the portable terminal 3 makes this determination by detecting whether or not data have been received from the base station 2. If the reception of radio transmission is possible, the portable terminal 3 proceeds to step S3. If that reception is not possible, the portable terminal 3 proceeds to step S7.

At step S7, the portable terminal 3 determines whether or not GPS satellites have been found by search for GPS satellites. If GPS satellites have been found, the portable terminal 3 proceeds to step S8, executes positioning on its own using the GPS signals, and obtains the secondary position data. On the other hand, when GPS satellites have not been found, the portable terminal 3 proceeds to step S9, executes a not-possible-to-execute-positioning process—for example, an error process—and terminates this positioning process.

At step S3, the portable terminal 3 tries to obtain the area data of the base station 2. For example, it obtains the secondary position data made of the area data sent from the base station 2. Based on these area data, the portable terminal 3 searches for GPS satellites and determines, at step S4, whether GPS satellites have been found. When GPS satellites have been found, the portable terminal 3 proceeds to step S5, and when GPS satellites have not been found, it proceeds to step S10.

At step S10, the portable terminal 3 obtains as a result of measuring positions the area data of the base station 2.

At step S5, the portable terminal 3 determines whether there exist DGPS data (position-correction data) from radio-call base-station 12. For example, the portable terminal 3 determines whether position-correction data are stored in the data sent from the base station 2. If DGPS data exist, the portable terminal 3 obtains the position using those DGPS data—in other words, the secondary position data corrected by the position-correction data. When DGPS data do not exist, the portable terminal 3 proceeds to step S11, executes positioning on its own using the GPS signals, and obtains the secondary position data.

Through a sequence of such processes as described above, the portable terminal 3 obtains position data.

In other words, the portable terminal 3 obtains position data based on the GPS signals sent from GPS satellites at step S11, and in the case where DGPS data have been received from the base station 2, it corrects the position data using these DGPS data at step S6.

Also, when it is not possible to find GPS satellites, the portable terminal 3 obtains position data based on the area data of the base station 2 at step S10.

When it is not possible to receive data from the base station 2, the portable terminal 3 obtains position data by searching for GPS satellites and receiving GPS signals at step S8.

The portable terminal 3 uses the position data that it obtained through such processes as data for executing application programs.

The positioning system is composed of the component parts as described above. By organizing the positioning system in such a way, the following is made possible:

The portable device 3 can measure a position based on data sent from the base station 2 by utilizing a radio-calling system. By this means, the portable terminal 3 can obtain information on its approximate current position based on data sent from the base station 2, even if it is found at a place where it cannot directly receive radio waves from the GPS satellites such as in an underground center or inside a building, as long as it can make use of a radio-calling system.

Also, when one has traveled a long distance without having measured a position using GPS satellites, for example, if one tries to start measuring a position using GPS satellites, it becomes necessary to search for GPS satellites.

However, since the portable terminal 3 can determine its approximate current position as the primary position data based on the data from the base station 2, the time needed to search for GPS satellites can be reduced even in such cases.

Also, when measuring a position using GPS satellites, the portable terminal 3 corrects the error in the GPS signals sent from satellites, using the position-correction data sent from the radio-call base-station. Through this means, more accurate position data can be obtained.

Since the portable terminal 3 can automatically switch frequencies from the base station 2, which are different for each radio-call area, using the positions measured by means of GPS satellites, it becomes possible to automatically select radio-calling by area. For example, the portable terminal 3 can receive data from the base station, even when it has been moved to a neighboring service area without having the user adjust it manually.

Also, since radio-call base-stations 12—in other words, a base station made by installing a GPS standard receiver 11 in a radio-call base-station 12—exist in relatively large numbers, it becomes possible, in general, to offer a position-correction system the accuracy of which is higher than that of a position-correction system that makes use of FM-multiplex broadcasting. In other words, by having each base station 2 covering a relatively small service area generate position-correction data, the position data obtained at the portable terminal 3 using said position-correction data become information that indicates accurately the current position of the terminal.

Also, since the base station 2 can be made by simply adding a GPS standard receiver 11 to an existing radio-call base-station 12, one can easily build an infrastructure, which is simpler than making a new network.

Also, the positioning system is not limited to a structure made by using four GPS satellites. Such system can be built using more than five GPS satellites.

Although it is explained in the above-described actual example that position-correction data are generated by installing the GPS standard receiver 11 at each base station 2, it is possible, for example to generate position-correction data at the central station created to control data for the base stations 2. In this case, the position-correction data generated at the GPS standard receiver 11 installed at the central station are sent to each base station. And these position-correction data sent from the central station are corrected further at each base station in consideration of the location of each base station and are sent to portable terminals 3. Also, as for correcting position-correction data in view of the difference in location of each base station, it can be done at the central station in advance for each base station, and these corrected data can be sent to each base station.

The positioning system of the present invention has a radio-call base-station that transmits data and a positioning device equipped with a receiving means to receive data sent from a radio-call base-station and a positioning means to obtain position data indicating the current position of the device based on data sent from a radio-call base-station. A positioning device can obtain, through the positional means, position data indicating the current position of the device based on data sent from a radio-call base-station.

By the positioning system, a positioning device can obtain position data as long as it can receive data from a radio-call base-station.

Also, according to the positioning method of the present invention, by obtaining position data indicating the current position of the device based on data sent from a radio-call base-station, position data can be obtained as long as data from a radio-call base-station can be received.

Also, the positioning device of the present invention, by being equipped with a receiving means to receive data sent from a radio-call base-station and a positioning means to obtain position data indicating the current position of the device based on data sent from a radio-call base-station, can obtain position data indicating the current position of the device based on data sent from a radio-call base-station by the positioning means.

By the positioning means, the positioning device can obtain position data as long as it can receive data from a radio-call base-station.

The positioning system of the present invention also comprises a position-correction-data-generating means that generates position-correction data to correct the position data obtained by the positioning device on measuring a relevant position and a radio-call base-station equipped with a transmission means to send data to the positioning device. A positioning system of the present invention also has a positioning device equipped with a receiving means to receive data sent from a radio-call base-station, a positioning means to obtain position data on measuring the current position of the device based on signals sent from artificial satellites, and a position-data-correction means to correct the position data based on the position-correction data received by a receiving means. In a positioning system having such a configuration, the radio-call base-station can send position-correction data generated by the position-correction-data-generating means to a positioning device using a transmission means, and the positioning device can correct, via the position-data-correction means, the position data, obtained by measuring the current position of the device based on signals sent from artificial satellites by the positioning means, using the position-correction data received by the receiving means.

Since, in the positioning system, the positioning device can correct position data using position-correction data—data generated at the radio-call base-station—sent from said radio-call base-station covering a relatively narrow service area, the accuracy of position data can be improved.

Also, according to the positioning method of the present invention, by correcting the position data obtained by measuring the current position of the device based on signals sent from artificial satellites using the position-correction data sent from a radio-call base-station, position data can be corrected using the position-correction data—data generated at the radio-call base-station—sent from said radio-call base-station covering a relatively narrow service area, which makes it possible to improve the accuracy of position data.

What is claimed is:

1. A positioning system for obtaining information about a current position of a device, comprising:

a radio-call base-station which sends data; and a positioning device including a receiving means which receives data sent from said radio-call base-station, and a first positioning means which obtains position data indicating a current position of the device based on data sent from said radio-call base-station, a secondary positioning means to obtain secondary position data by measuring the current position of the device based on signals sent from artificial satellites, and a reception-frequency-switching means to switch a reception frequency based on said secondary position data, wherein said radio-call base-station is equipped with a position-correction-data-generating means to generate position-correction data to correct said secondary position data, and wherein said secondary positioning means includes a position-data-correction means to correct said secondary position data using said position data sent from said radio-call base-station.

2. The positioning system of claim 1, wherein said first positioning means obtains position data indicating the current position of the device based on area data, showing a location of said radio-call base-station, sent from said radio-call base-station.

3. The positioning system of claim 1, wherein said positioning device obtains position data by said first positioning means when it is impossible to measure the position of the device using said secondary positioning means.

4. A positioning method for obtaining information about a current position of a device, comprising the steps of:

sending data from a radio-call base station;

receiving data sent from said radio-call base station at a positioning device;

obtaining position data indicating a current position of the device based on data sent from said radio-call base-station;

correcting the position data obtained by measuring the current position of the device based on signals sent from artificial satellites by using position-correction data generated at said radio-call base-station and sent from said radio-call base-station; and causing the positioning device that receives data sent from said radio-call base-station to switch reception frequencies based on said position data.

5. The positioning method of claim 4, wherein position data indicating the current position of the device are obtained based on area data, showing a location of said radio-call base-station, sent from said radio-call base-station.

6. The positioning method of claim 4, wherein said position data are obtained based on data sent from said radio-call base-station when it is not possible to measure the current position of the device based on signals sent from artificial satellites.

7. A positioning device for obtaining information about a current position of the device comprising:

a receiving means which receives data sent from a radio-call base-station, a first positioning means which obtains position data indicating the current position of the device based on data sent from said radio-call base-station;

a secondary positioning means to obtain secondary position data on measuring the current position of the device based on signals sent from artificial satellites;

a position-data-correction means to correct said secondary position data using said position-correction data sent from said radio-call base-station; and a reception-frequency-switching means to switch reception-frequencies based on said secondary position data.

8. The positioning device of claim 7, wherein said first positioning means obtains position data indicating the current position of the device based on area data, showing a location of said radio-call base-station, sent from said radio-call base-station.

9. The positioning device of claim 7 wherein said first positioning means obtains said position data when it is not possible to measure the position of the device using said secondary positioning means.

* * * * *